Figure 1:
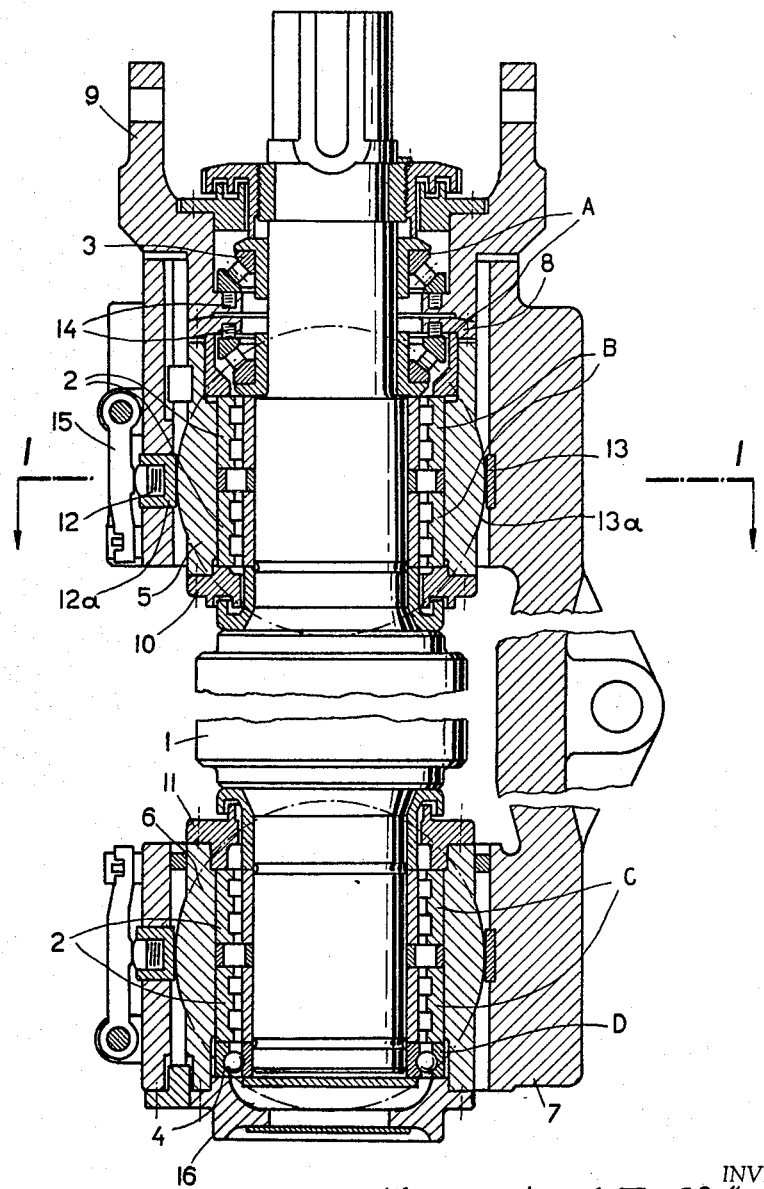

Aug. 2, 1966   L. MALY ETAL   3,264,042
DEVICE PERMITTING AN EQUAL DISTRIBUTION OF THE PRESSURE
Filed May 13, 1964   2 Sheets-Sheet 1

INVENTORS
Ladislav Malý, Jan Fröhlich,
Jan Staněk, František Svačina
By Richard Low
ag't

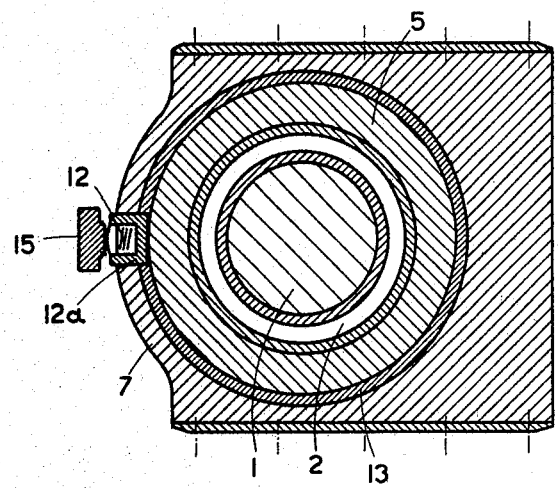

3,264,042
DEVICE PERMITTING AN EQUAL DISTRIBUTION
OF THE PRESSURE
Ladislav Malý, Jan Fröhlich, and Jan Staněk, Prague, and
František Svačina, Ostrava, Czechoslovakia, assignors
to Vitkovicke zelezarny Klementa Gottwalda, narodni
podnik, Ostrava, Czechoslovakia
Filed May 13, 1964, Ser. No. 366,982
Claims priority, application Czechoslovakia,
May 17, 1963, 2,816/63
1 Claim. (Cl. 308—177)

The invention relates to a device for such a bedding of the simultaneously loaded antifriction bearings in vertical mechanical equipments, such as wire-drawing benches wire rolling mills, and especially rolling stands, that the rolling load be equally distributed on each of the simultaneously loaded bearings.

In connection with the bedding of antifriction bearings ever increasing stress is laid on over more stable bearings seating with a minimum built-in bearing space. For taking up the high roll pressures that arise in case of high rolling speed use is made in the latest technical solutions of multiple-row roller bearings or of pair of double-row roller bearings on the roll journal. In order to secure the longest possible service life of the bearings it is necessary for the rolling pressures to be equally distributed on each of the rollers and for the terminal bearing rows not to be overcharged by the pitching moment forces resulting from nonalignment of the bearing bodies and from elastic deformations, plastic deformations, and roll crossings. When a common shackle for both bearing bodies is used, cross-bedding is for constructional reasons not always possible; in such cases the bearing bodies are rigidly fitted in the shackle eyes. Such a solution, however, results in considerable reduction of bearings service life, to say nothing of its requiring a high degrees of machining accuracy since possibly most accurate holes alignment must be attained in spite of the holes being distant as much as 3.000 mm. from one another. The service life is further adversely influenced by roll and shackle deformations resulting from the loads that cannot be avoided in such constructions.

The aforesaid disadvantages are eliminated or at least considerably diminished by the device according to the present invention wherein two bearing bushings, fitted in the eyes of the common shackle, are used: an upper one and a lower one. The essence of the invention consists in the fact that in the middle of the outer roll surface of each bearing bushing a spherical area is machined the diameter of which corresponds to those of the holes in the rings with which the spherical area is in contact on its periphery; the rings are fitted, preferably by welding-on, in the shackle holes and given adequate recesses to admit the corresponding support shoes which rest, in a point, against the bearing bushings spherical area and are springed back by means of adjustable pressure rings.

An embodiment of the invention in case of a rolling stand may be seen on the adjacent drawings wherein FIG. 1 is a sectional view of the device and FIG. 2 a sectional view along the line 1—1.

The working roll 1 is radially guided on each of its journals in two coupled double-row roller bearings 2 and axially guided in both directions by two tapered-roller thrust bearings 3. The lower bearing cover 6 is axially secured by means of the single-row ball bearing 4. Between the inner and the outer rings of the coupled double-row roller bearings 2 are inserted distance rings. The thrust roller bearings 3 are bedded on the journal by means of bushings with springs. The effects of centrifugal forces are annihilated by the pushing springs 14 which press against the outer ring of the relieved bearing. The bearings are grease lubricated. The bearing spaces are enclosed by the upper and lower covers of the upper bearing bushing 5 with labyrinths and sealing rings, by the upper cover 11 of the lower bearing bushing 6 with sealing, and by the lower cover 16 of the lower bearing bushing 6.

The upper bearing bushing 5 and the lower bearing bushing 6 are spherically fitted in the shackle 7 in such a way that the rings 13 are rigidly fixed, preferably by welding-on, in the shackle eyes. On the points of contact with the rings they are provided with spherical areas 13a. The constancy of contact between the rings in the shackle eyes and the spherical supports of the upper and the lower bearing covers is ensured by the hollow supporting lenses 12a which are pressed in the places of the rings 13 recesses by the Belleville springs 12 resting against the one-armed levers 15 by means of which the pressure of the springs 12 can be adjusted. The upper bearing cover 5 and the lower bearing cover 6 are secured against torsional displacement in the shackle eyes by means of springs.

The weight of the roll 1 is taken up through the end nut, the upper roller thrust bearing 3 and the suspension eye 9 by the shackle 7 and the rolling stand frame. The upper bearing cover 5 is closed by the cover 8 the front area of which, bearing against the suspension eye 9, is chamfered in order to facilitate the back movement of the bearing bushing in case of larger roll deflections.

The device structure having thus been described, we are now going to explain its function under normal rolling conditions and in case of perturbations.

At the pass of the material being rolled between the working rolls in a vertical rolling stand the rolls deflect in the radial direction. This deflection causes the bearing bushings 5 and 6 to excute a rotating movement around their radial axes which are simultaneously those of the spherical areas 13a, thus keeping their normal position. In that way the equal distribution of the loading forces produced by the rolling pressures on all the bearing rows is preserved. The upper tapered-roller thrust bearing 3 seated on the roll 1 journal outside the bearing bushing 5 provided with the spherical areas 13a carries the weight of the roll including that of all radial bearings B, C, and D carried in the bearing bushings and of the tapered-roller thrust bearing A carried in the upper bearing bushing 5.

In case the material passing between the working rolls turns askew the rolls get displaced radially, the aforesaid applying in such an event, as well as axially from one another and then the axial pressure originated by the material's turning askew is taken up by the tapered-roller thrust bearing A carried in the upper bearing bushing 5. The same applies to shackle eyes misalignment.

In every case the service life of the bearings is thus considerably prolonged.

What we claim is:

A device permitting an equal distribution of the pressure on each of the simultaneously loaded antifriction bearings in vertical mechanical equipments, especially vertical rolling stands provided with pairs of bearing bushings located in the eyes of a common carrying shackle, and consisting of bearing bushings provided, each of them, in the middle of its outer cylindrical surface with a spherical area, further of rings fitted in the recesses of the carrying shackle eyes the rings having a diameter corresponding to that of the aforesaid spherical surfaces with which they come in contact on their peripheries and being provided with openings, and finally of hollow supporting shoes passing through the aforesaid ring openings and resting against the aforesaid bearing bushing spherical areas, the supporting shoes being urged back by adjustable springs.

References Cited by the Examiner
UNITED STATES PATENTS 1,586,150   5/1926   Heim _____ 308—194

DAVID J. WILLIAMOWSKY, *Primary Examiner.*

FRANK SUSKO, *Examiner.*